(12) United States Patent
Shiraishi et al.

(10) Patent No.: US 12,045,603 B2
(45) Date of Patent: Jul. 23, 2024

(54) MODULE DELIVERY SYSTEM, VEHICLE, AND METHOD FOR DELIVERING MODULES

(71) Applicant: TOYOTA JIDOSHA KABUSHIKI KAISHA, Toyota (JP)

(72) Inventors: Shinichi Shiraishi, Saitama (JP); Naoya Asao, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 18/055,460

(22) Filed: Nov. 15, 2022

(65) Prior Publication Data

US 2023/0176854 A1 Jun. 8, 2023

(51) Int. Cl.
*G06F 9/44* (2018.01)
*G06F 8/65* (2018.01)

(52) U.S. Cl.
CPC ...................................... *G06F 8/65* (2013.01)

(58) Field of Classification Search
None
See application file for complete search history.

(56) References Cited

U.S. PATENT DOCUMENTS

| | | | | |
|---|---|---|---|---|
| 9,841,965 | B2* | 12/2017 | Moeller | G06F 8/65 |
| 2016/0306619 | A1* | 10/2016 | Yan | G06F 8/65 |
| 2017/0026492 | A1* | 1/2017 | Kawamura | G06F 8/60 |
| 2019/0087169 | A1* | 3/2019 | Arai | G06F 8/654 |
| 2019/0342162 | A1* | 11/2019 | Bendre | G06F 8/60 |
| 2022/0300274 | A1* | 9/2022 | Inoue | G06F 8/654 |

FOREIGN PATENT DOCUMENTS

| | | |
|---|---|---|
| JP | 2018-132979 A | 8/2018 |
| WO | 2015/159815 A1 | 10/2015 |

* cited by examiner

*Primary Examiner* — Qamrun Nahar
(74) *Attorney, Agent, or Firm* — Dickinson Wright, PLLC

(57) ABSTRACT

A module delivery system notifies a driver of a vehicle that, of programs executed by a processor mounted on the vehicle, a program corresponding to a delivered update module delivered from a server to the vehicle via a communication network is updatable. In response to a predetermined operation by the driver responding to the notification, the system updates the program corresponding to the delivered update module with the delivered update module. For each of attributes, the system calculates a representative value of hold times, each being the time from delivery of the delivered update module having the attribute until update of the program corresponding to the delivered update module. The system then delivers an update module having an attribute with a smaller representative value of hold times more preferentially to the vehicle via the communication network.

6 Claims, 6 Drawing Sheets

| PROGRAMS | UPDATE MODULES | VERSIONS | ATTRIBUTES |
|---|---|---|---|
| P0011 | M0011-121 | 1.21 | IMPROVEMENT |
| P0012 | M0012-200 | 2.00 | ADDITION OF FUNCTIONS |
| P0013 | M0013-111 | 1.11 | IMPROVEMENT |
| ... | ... | ... | ... |

| VEHICLE IDENTIFYING INFORMATION | ATTRIBUTES | HOLD TIMES |
|---|---|---|
| V001 | ADDITION OF FUNCTIONS | 2:20 |
| V001 | IMPROVEMENT | 7:55 |
| V022 | ADDITION OF FUNCTIONS | 12:40 |
| V022 | IMPROVEMENT | 8:05 |
| ... | ... | ... |

MODULE DELIVERY SYSTEM, VEHICLE, AND METHOD FOR DELIVERING MODULES

FIELD

The present disclosure relates to a module delivery system that delivers update modules of programs via a communication network as well as a vehicle and a method for delivering modules.

BACKGROUND

A vehicle may be equipped with multiple electronic control units (ECUs) that execute predetermined programs to control operation of various devices mounted on the vehicle. The programs executed by the ECUs are updatable with update modules delivered via a communication network. Regarding a vehicle, the time during which update modules can be delivered via a communication network may be restricted to a drivable time during which a power source, such as an engine or a motor, is ON; and a communication channel broad enough to connect to a communication network may be unavailable. In such cases, an enormous amount of time is necessary to deliver, via the communication network, multiple update modules for updating respective programs executed by multiple ECUs. In this situation, for example, an update module of high priority for a vehicle driver is delivered and applied later than a low-priority update module, which may decrease the driver's convenience.

Japanese Unexamined Patent Publication No. 2018-132979 (hereafter, "Patent Literature 1") describes a software update system that manages software for update delivered by an update software delivery unit on the basis of priorities of software update of control units mounted on a vehicle.

SUMMARY

In the software update system described in Patent Literature 1, the priorities of software update are determined by a server, based on, for example, categories of functions of ECUs that execute software. For this reason, the software update system described in Patent Literature 1 cannot preferentially deliver an update module of high priority for a vehicle driver to his/her vehicle.

It is an object of the present disclosure to provide a module delivery system that can preferentially deliver an update module of high priority for a vehicle driver to his/her vehicle.

The module delivery system according to the present disclosure includes a vehicle and a server. The vehicle is equipped with at least one processor to execute programs, and the server is configured to deliver update modules for updating the respective programs to new versions to the vehicle via a communication network. The vehicle includes a processor configured to notify a driver of the vehicle that, of the programs, a program corresponding to a delivered update module delivered from the server is updatable. The processor of the vehicle is further configured to update, in response to a predetermined operation by the driver responding to the notification, the program corresponding to the delivered update module with the delivered update module and transmit, to the server, data indicating a hold time from delivery of the delivered update module until update of the program corresponding to the delivered update module. The server includes a processor configured to calculate, for each of attributes, a representative value of hold times of delivered update modules having the attribute The processor of the server is further configured to deliver an update module having an attribute with a smaller representative value of hold times more preferentially to the vehicle via the communication network.

The processor of the vehicle of the module delivery system according to the present disclosure preferably notifies, at the notification, the driver that the program is updatable, in the case that the vehicle is in a drivable state at a current time and that the current time is within a time of day during which the start of a drivable state of the vehicle continuing longer than a predetermined time was recorded.

The processor of the vehicle of the module delivery system according to the present disclosure preferably notifies, at the notification, the driver that the program is updatable, in the case that the vehicle is in a drivable state and stopped at a current time.

The processor of the server of the module delivery system according to the present disclosure preferably delivers, at the delivery, an update module having an attribute with a smaller representative value of hold times earlier or through a communication channel with a broader band to the vehicle via the communication network.

A server according to the present disclosure includes a processor configured to deliver an update module for updating one of programs executed by a processor mounted on a vehicle to the vehicle via a communication network. The processor of the server is further configured to receive, from the vehicle, data indicating a hold time from delivery of the update module until update of a program corresponding to the delivered update module and calculate, for each of attributes, a representative value of hold times of update modules having the attribute. The processor of the server delivers, at the delivery, an update module having an attribute with a smaller representative value of hold times more preferentially to the vehicle via the communication network.

A vehicle according to the present disclosure includes a processor configured to notify a driver of a vehicle that, of programs executed by a processor mounted on the vehicle, a program corresponding to an update module delivered from a server via a communication network is updatable. The processor of the vehicle is further configured to update, in response to a predetermined operation by the driver responding to the notification, the program corresponding to the update module delivered from the server with the update module and transmits, to the server, data indicating a hold time from delivery of the update module until update of the program corresponding to the update module.

A method for delivering modules according to the present disclosure includes notifying a driver of a vehicle that, of programs executed by a processor mounted on the vehicle, a program corresponding to a delivered update module delivered from a server to the vehicle via a communication network is updatable; and, in response to a predetermined operation by the driver responding to the notification, updating the program corresponding to the delivered update module with the delivered update module. The method further includes calculating, for each of attributes, a representative value of hold times, each being the time from delivery of the delivered update module having the attribute until update of the program corresponding to the delivered update module; and delivering an update module having an attribute with a smaller representative value of hold times more preferentially to the vehicle via the communication network.

The module delivery system according to the present disclosure can preferentially deliver an update module of high priority for a vehicle driver to his/her vehicle.

DESCRIPTION OF EMBODIMENTS

A module delivery system that can preferentially deliver an update module of a program of high priority for a vehicle driver to his/her vehicle will now be described in detail with reference to the attached drawings. The module delivery system includes a vehicle and a server. The vehicle is equipped with at least one processor to execute programs, and the server is configured to deliver update modules for updating the respective programs to new versions to the vehicle via a communication network. The vehicle notifies a driver of the vehicle that, of the programs, a program corresponding to a delivered update module delivered from the server is updatable. In response to a predetermined operation by the driver responding to the notification, the vehicle updates the program corresponding to the delivered update module with the delivered update module and transmits, to the server, data indicating a hold time from delivery of the delivered update module until update of the program corresponding to the delivered update module. For each of attributes, the server calculates a representative value of hold times of delivered update modules having the attribute. Examples of the attributes of the update modules include "addition of functions," which indicates that a function will be added to a program by update, and "improvement," which indicates that a program will be improved by update. The server delivers an update module having an attribute with a smaller representative value of hold times more preferentially to the vehicle via the communication network.

Figure 1:
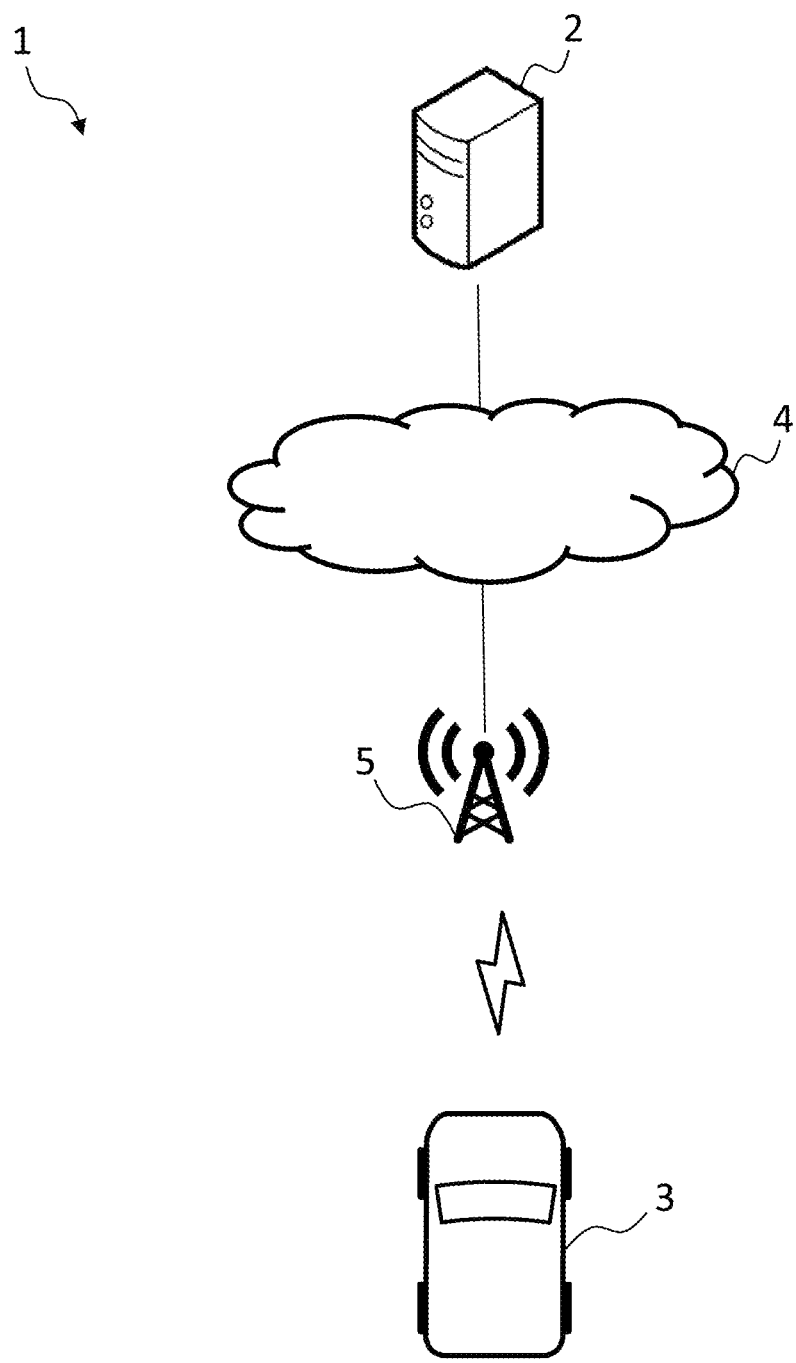
FIG. 1 schematically illustrates the configuration of a module delivery system.

FIG. 1 schematically illustrates the configuration of the module delivery system.

The module delivery system 1 of the present embodiment includes a server 2 and a vehicle 3. The vehicle 3 is communicably connected to the server 2, for example, via a communication network 4 connected with the server 2 and via a wireless base station 5 connected to the communication network, for example, via a gateway (not illustrated). The server 2 delivers update modules for updating programs executed by at least one processor mounted on the vehicle 3 to the vehicle 3. The vehicle 3 is one of vehicles included in the module delivery system 1. In the module delivery system 1, the communication network 4 may be connected with multiple wireless base stations 5.

Figure 2:
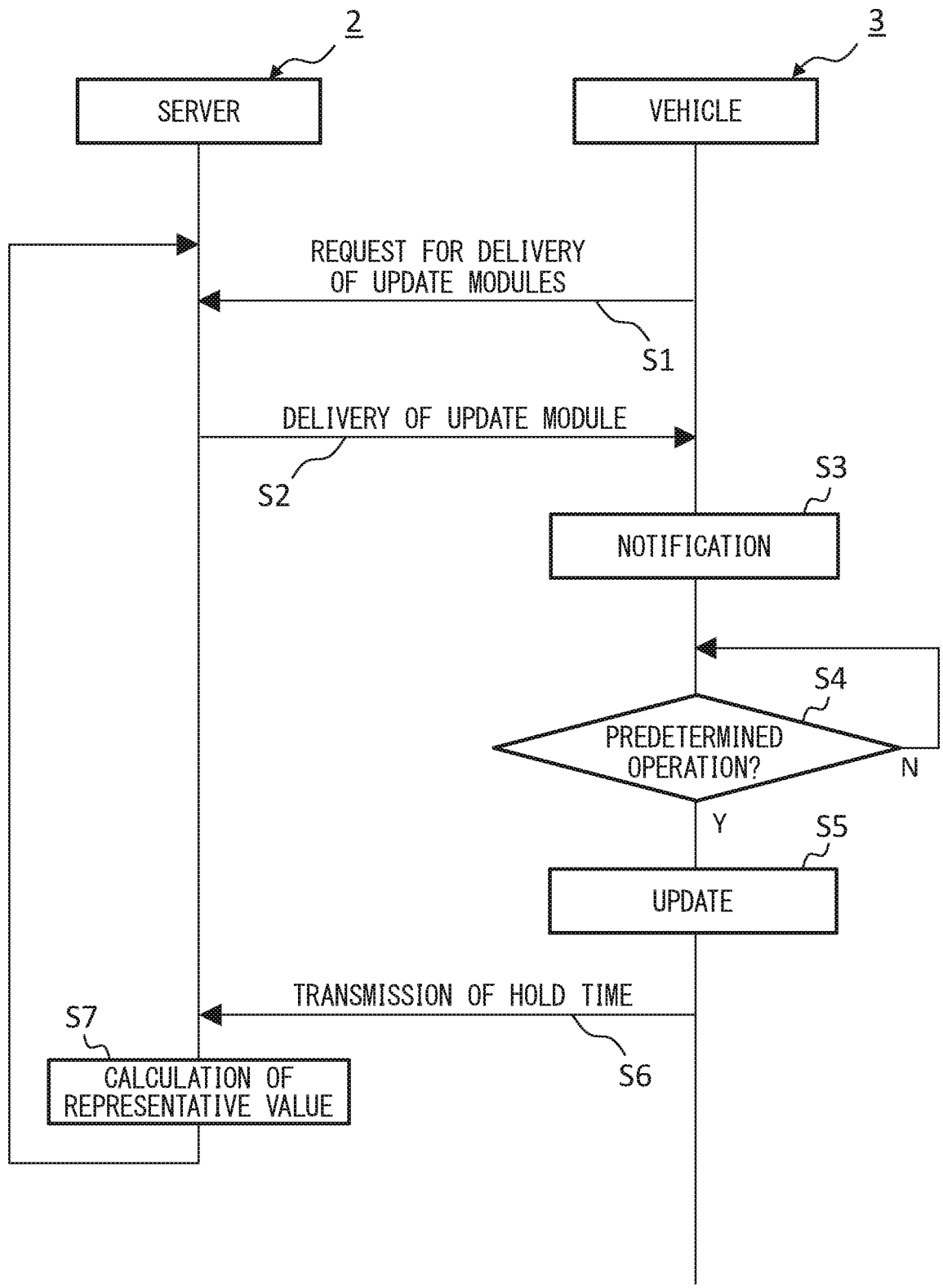
FIG. 2 illustrates the sequence of operation of a module delivery process in the module delivery system.

FIG. 2 illustrates the sequence of operation of a module delivery process in the module delivery system 1.

In the module delivery system 1, the vehicle 3 transmits a signal to request delivery of update modules to the server 2 via the wireless base station 5 and the communication network 4 (step S1). The signal to request delivery of update modules includes vehicle identifying information for identifying the vehicle 3 and version information of programs executed by the vehicle 3.

In response to the request for delivery of update modules, the server 2 delivers an update module to the vehicle 3 via the communication network 4 and the wireless base station 5 (step S2).

The vehicle 3 notifies the driver of the vehicle 3 that, of the programs executed by the processor mounted on the vehicle 3, a program corresponding to the delivered update module is updatable (step S3).

The vehicle 3 determines whether the driver responding to the notification has performed a predetermined operation (step S4). If it is determined that the predetermined operation has not been performed (No in step S4), the process returns to step S4 and the vehicle repeats determination of the predetermined operation.

If it is determined that the predetermined operation has been performed (Yes in step S4), the vehicle 3 updates the program corresponding to the delivered update module with the delivered update module (step S5).

The vehicle 3 then transmits data indicating a hold time to the server via the wireless base station 5 and the communication network 4 (step S6). The hold time is a length of time from delivery of the update module until update of the program corresponding to the update module.

For each of attributes, the server 2 calculates a representative value of hold times (step S7). The process of the server 2 then return to step S1, and the server waits for a request for delivery of update modules from the vehicle 3. The hold time is a period from delivery of the update module to the vehicle 3 until update of the program corresponding to the update module.

At the delivery of an update module in step S2, the server 2 delivers an update module having an attribute with a smaller representative value of hold times more preferentially to the vehicle 3.

Figures 3, 4:
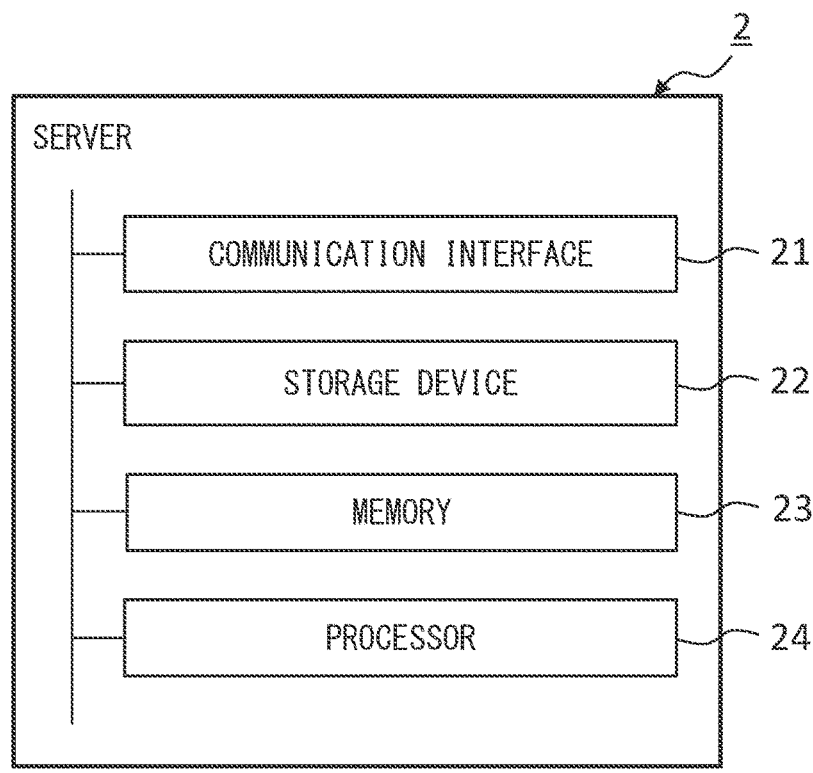
FIG. 3 illustrates the hardware configuration of a server.
FIG. 4 illustrates an example of attributes of update modules.

FIG. 3 illustrates the hardware configuration of the server 2.

Of update modules for updating the programs executed by the vehicle 3, the server 2 delivers an update module having an attribute with a smaller representative value of hold times more preferentially to the vehicle 3 via the communication network 4. To achieve this, the server 2 includes a communication interface 21, a storage device 22, a memory 23, and a processor 24.

The communication interface 21, which is an example of a communication unit, includes an interface circuit for connecting the server 2 to the communication network 4. The communication interface 21 is configured to be communicable with the vehicle 3 via the communication network 4 and the wireless base station 5. More specifically, the communication interface 21 passes, for example, data indicating a hold time, which is received from the vehicle 3 via the wireless base station 5 and the communication network 4, to the processor 24. Additionally, the communication interface 21 transmits update modules and other data received from the processor 24 to the vehicle 3 via the communication network 4 and the wireless base station 5.

The storage device 22, which is an example of a storage unit, includes storage, such as a hard disk drive or a nonvolatile semiconductor memory. In association with each of the programs executed by the vehicle 3, the storage device 22 stores an update module for updating the program and an attribute of the update module. In association with each of the vehicles, the storage device 22 stores a representative value of hold times of update modules on an attribute-by-attribute basis.

FIG. 4 illustrates an example of attributes of update modules.

The storage device 22 stores attributes indicating characteristics of update modules stored in association with programs. Examples of such attributes include "addition of functions," which indicates that the update module is to add a function to a program, and "improvement," which indicates that the update module is to improve a program. The storage device 22 also stores version information of programs updated with the update modules.

In the example of FIG. 4, update module M0011-121 is to update program P0011 to version 1.21 and has attribute "improvement." Update module M0012-200 is to update program P0012 to version 2.00 and has attribute "addition of functions." Update module M0013-111 is to update program P0013 to version 1.11 and has attribute "improvement."

Figures 5, 6:
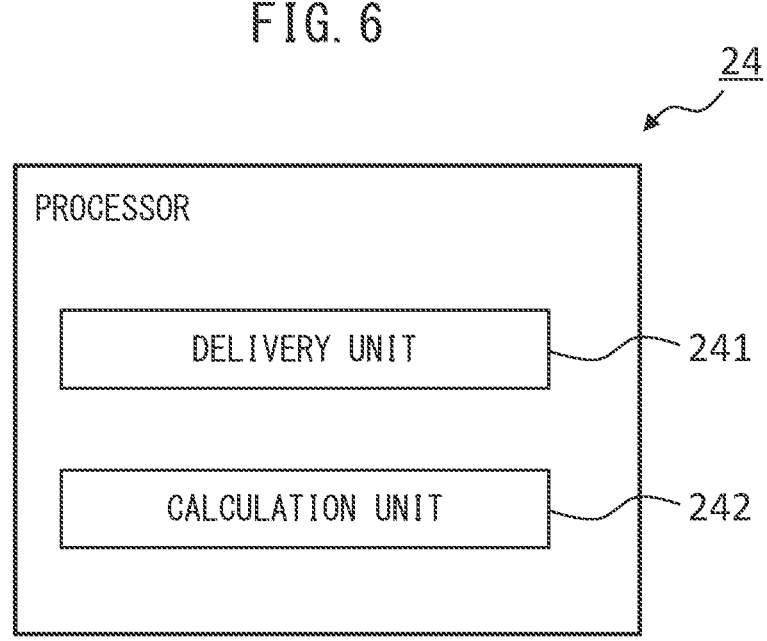
FIG. 5 illustrates an example of representative values of hold times of each attribute.
FIG. 6 is a functional block diagram of a processor included in the server.

FIG. 5 illustrates an example of representative values of hold times of each attribute.

In association with vehicle identifying information for identifying each of the vehicles, the storage device 22 stores a representative value of hold times of update modules on an attribute-by-attribute basis. In the example of FIG. 5, regarding a vehicle having vehicle identifying information V001, the representative value of hold times corresponding to attribute "addition of functions" is 2:20 whereas that of hold times corresponding to attribute "improvement" is 7:55. Regarding a vehicle having vehicle identifying information V022, the representative value of hold times corresponding to attribute "addition of functions" is 12:40 whereas that of hold times corresponding to attribute "improvement" is 8:05. The vehicle 3 is the vehicle having vehicle identifying information V001.

The memory 23 includes volatile and nonvolatile semiconductor memories. The memory 23 stores various types of data used for processing by the processor 24, such as data indicating a hold time, which is received from the vehicle 3 via the communication interface 21. The memory 23 also stores various application programs, such as a program for delivering update modules to the vehicle 3.

The processor 24 includes one or more central processing units (CPUs) and a peripheral circuit thereof. The processor 24 may further include another operating circuit, such as a logic-arithmetic unit or an arithmetic unit.

FIG. 6 is a functional block diagram of the processor 24 included in the server 2.

As its functional blocks, the processor 24 of the server 2 includes a delivery unit 241 and a calculation unit 242. These units included in the processor 24 are functional modules implemented by a program executed by the processor 24. The computer program for achieving the functions of the units of the processor 24 may be provided in a form recorded on a computer-readable and portable medium, such as a semiconductor memory, a magnetic medium, or an optical medium. Alternatively, the units included in the processor 24 may be implemented in the server 2 as separate integrated circuits, microprocessors, or firmware.

The delivery unit 241 receives a request for delivery from the vehicle 3 via the communication interface 21 and the communication network 4. In response to reception of the request for delivery, the delivery unit 241 delivers an update module to the vehicle 3 via the communication interface 21 and the communication network 4.

The delivery unit 241 selects update modules to be delivered from the update modules stored in the storage device 22. For example, the delivery unit 241 receives a request for delivery including version information of the programs executed by the vehicle 3. Of the update modules stored in the storage device 22, the delivery unit 241 then selects an update module such that the version information of the program corresponding thereto indicates a later version than that of a program included in the request for delivery, as an update module to be delivered.

For example, assume that version information of programs P0011, P0012, and P0013 included in a request for delivery received from the vehicle 3 is 1.20, 1.80, and 1.11, respectively. In this case, the version information of programs P0011 and P0012 stored in the storage device 22 indicates later versions than those included in the request for delivery. Thus the delivery unit 241 selects update modules M0011-121 and M0012-200 respectively corresponding to programs P0011 and P0012 as update modules to be delivered.

The delivery unit 241 delivers the selected update modules to be delivered, to the vehicle 3 via the communication interface 21 and the communication network 4. Specifically, the delivery unit 241 delivers an update module having an attribute with a smaller representative value of hold times more preferentially to the vehicle 3. Regarding the vehicle 3 (vehicle identifying information V001), the representative value of hold times corresponding to attribute "addition of functions," which is 2:20, is shorter than that of hold times corresponding to attribute "improvement," which is 7:55. Thus the delivery unit 241 delivers the update modules to the vehicle 3 so that the update module having attribute "addition of functions" is given higher priority than the update module having attribute "improvement."

For example, the delivery unit 241 selects update modules to be delivered so that an update module having an attribute with a smaller representative value of hold times is delivered earlier. In the above example, update modules M0011-121 and M0012-200, selected as update modules to be delivered, have attributes "improvement" and "addition of functions," respectively. The delivery unit 241 delivers update module M0012-200 having attribute "addition of functions" with a smaller representative value of hold times to the vehicle 3 earlier than update module M0011-121 having attribute "improvement" with a larger representative value of hold times.

The delivery unit 241 may deliver an update module having an attribute with a smaller representative value of hold times through a communication channel with a broader band to the vehicle 3 via the communication network 4. In the above example, the delivery unit 241 delivers update module M0012-200 having attribute "addition of functions" with a smaller representative value of hold times through a communication channel passing through a wireless base station 5 that enables communication conforming to the wireless communication standard of "5G" (5th Generation). The delivery unit 241 delivers update module M0011-121 having attribute "improvement" with a larger representative value of hold times through a communication channel passing through a wireless base station 5 that enables communication conforming to the wireless communication standard of "4G" (4th Generation).

For each attribute of update modules, the calculation unit 242 calculates a representative value of hold times, each being the time from delivery of an update module having the attribute until update of the program corresponding to the update module.

The calculation unit 242 receives information indicating a hold time corresponding to a delivered update module from the vehicle 3 via the communication interface 21 and the communication network 4. In response to reception of the information indicating a hold time, the calculation unit 242 calculates a representative value of hold times and updates one of the representative values of hold times stored in the storage device 22 on an attribute-by-attribute basis with the calculated representative value. The representative value of hold times is an average of hold times of delivered update modules having a predetermined attribute, or may be a statistic other than an average, such as a mode or a median. The updated representative value of hold times is used for subsequent delivery of update modules by the delivery unit 241.

Figure 7:
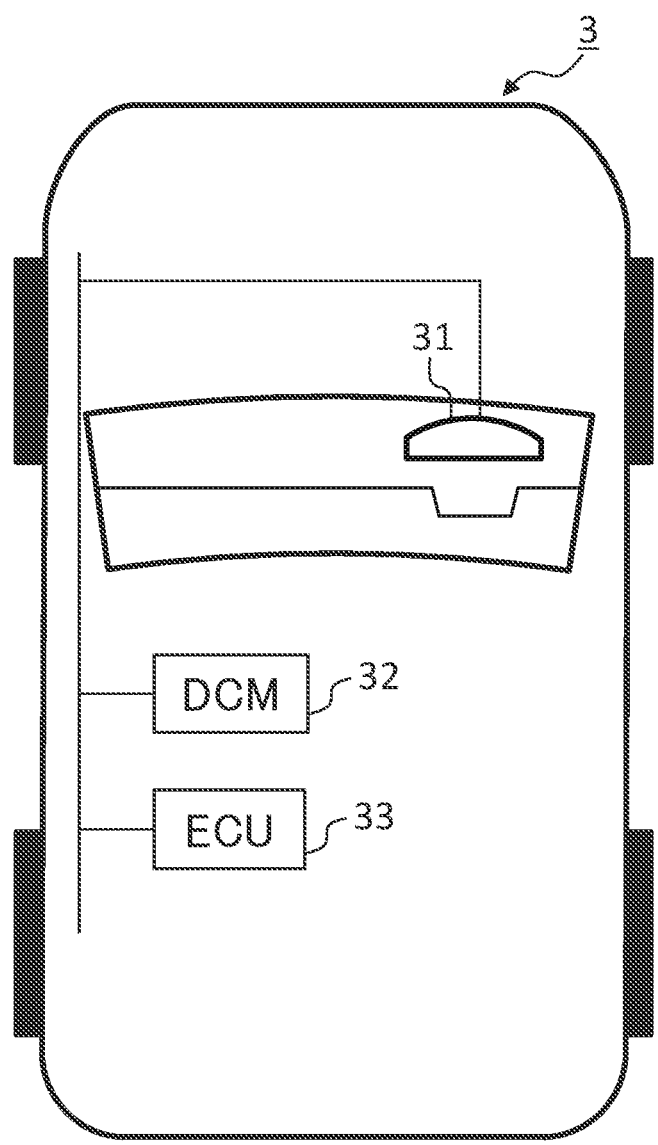
FIG. 7 schematically illustrates the configuration of a vehicle.

FIG. 7 schematically illustrates the configuration of the vehicle 3. The vehicle 3 includes a meter display 31, a data communication module 32, and an electronic control unit (ECU) 33. The meter display 31 and the data communication module 32 are communicably connected to the ECU 33 via an in-vehicle network conforming to a standard such as a controller area network.

The meter display 31, which is an example of a user interface device, includes, for example, a liquid crystal display. The meter display 31 displays a predetermined image so as to be visible to the driver, according to a signal received from the ECU 33 via the in-vehicle network. The meter display 31 is overlaid with a touch screen that can detect the driver's touch. The vehicle 3 may further include another user interface device, such as a speaker (not illustrated).

The data communication module 32, which is an example of a vehicle communication unit, is a device to execute processing for wireless communication conforming to a predetermined wireless communication standard, such as "5G" or "4G." The data communication module 32 accesses, for example, the wireless base station 5 to connect to the server 2 via the wireless base station 5 and the communication network 4. The data communication module 32 passes data included in a downlink wireless signal received from the wireless base station 5 to the ECU 33. Additionally, the data communication module 32 includes data received from the ECU 33 in an uplink wireless signal, and transmits the wireless signal to the wireless base station 5, thereby transmitting data to the server 2. The data communication module 32 may be implemented as a part of the ECU 33.

Figure 8:
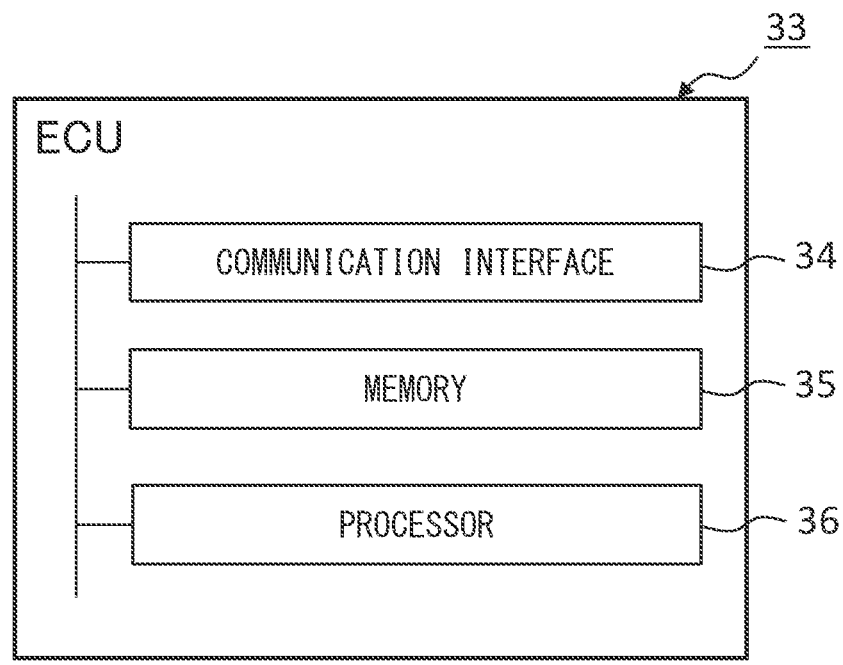
FIG. 8 illustrates the hardware configuration of an ECU included in the vehicle.

FIG. 8 illustrates the hardware configuration of the ECU 33 included in the vehicle 3.

The ECU 33 requests the server 2 to deliver update modules for updating programs executed by the vehicle 3, notifies the driver that a program is updatable with an update module delivered from the server 2, and transmits hold times of respective update modules to the server 2. To achieve this, the ECU 33 includes a communication interface 34, a memory 35, and a processor 36.

The communication interface 34, which is another example of a vehicle communication unit, includes a communication interface circuit for connecting the ECU 33 to the in-vehicle network. The communication interface 34 provides received data for the processor 36, and outputs data provided from the processor 36 to an external device.

The memory 35, which is an example of a vehicle storage unit, includes volatile and nonvolatile semiconductor memories. The memory 35 stores various types of data used for processing by the processor 36, such as delivered update modules delivered from the server 2 and times of delivery of the respective delivered update modules. For each time of day, the memory 35 stores the duration of a drivable state of the vehicle 3 whose start was recorded in the time of day. The drivable state of the vehicle 3 refers to the state in which the vehicle 3 can be driven according to the driver's operation, e.g., the state in which the ignition switch of a power source for powering the vehicle 3, such as an engine or a motor, is ON. The memory 35 also stores various application programs, such as a program-updating program for executing a program update process and programs to be updated with delivered update modules by the program update process.

The processor 36, which is an example of a vehicle control unit, includes one or more processors and a peripheral circuit thereof. The processor 36 may further include another operating circuit, such as a logic-arithmetic unit, an arithmetic unit, or a graphics processing unit.

Figure 9:
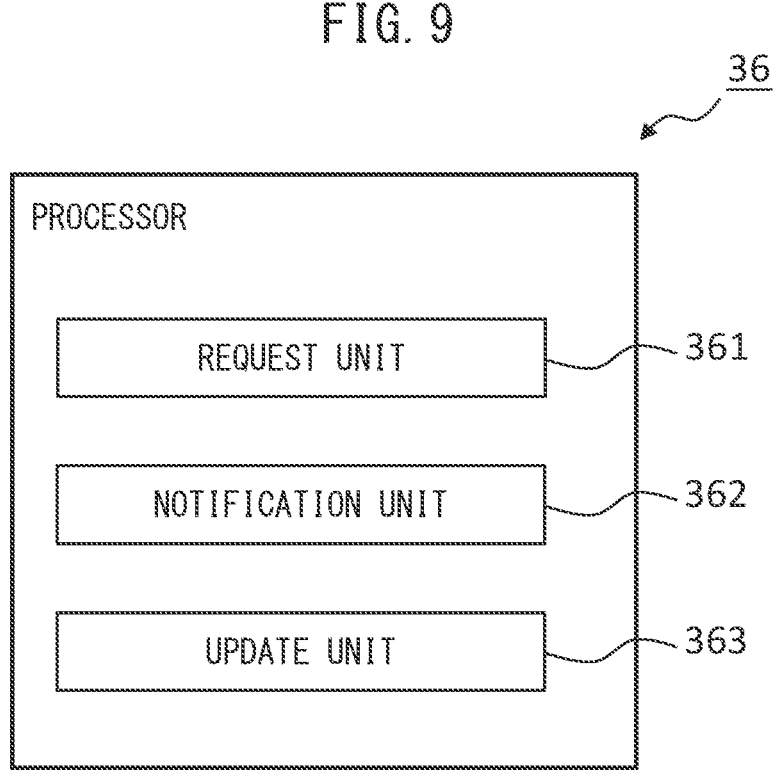
FIG. 9 is a functional block diagram of a processor included in the ECU.

FIG. 9 is a functional block diagram of the processor 36 included in the ECU 33.

As its functional blocks, the processor 36 of the ECU 33 includes a request unit 361, a notification unit 362, and an update unit 363. These units included in the processor 36 are functional modules implemented by a computer program stored in the memory 35 and executed by the processor 36. The computer program for achieving the functions of the units of the processor 36 may be provided in a form recorded on a computer-readable and portable medium, such as a semiconductor memory, a magnetic medium, or an optical medium. Alternatively, the units included in the processor 36 may be implemented in the ECU 33 as separate integrated circuits, microprocessors, or firmware.

The request unit 361 transmits a signal to request delivery of update modules (a request signal) to the server 2 via the wireless base station 5 and the communication network 4. For example, the request unit 361 transmits a request signal when the ECU 33 starts operating at the start of use of the vehicle 3. The request unit 361 may refer to the duration of a drivable state of the vehicle 3 stored in the memory 35 for each time of day, and transmit a request signal in the case that the current time is within a time of day during which the start of a drivable state of the vehicle 3 continuing longer than a predetermined time (e.g., an hour) was recorded.

The notification unit 362 notifies the driver of the vehicle that, of the programs executed by the processor mounted on the vehicle, a program corresponding to a delivered update module delivered from the server to the vehicle via the communication network is updatable.

The notification unit 362 causes the meter display 31 to display an image including a character string such as "You can update program XX. Function YY will be added by this update," thereby notifying the driver that one of the programs executed by the vehicle 3 is updatable.

The notification unit 362 may cause a speaker to play back a voice saying, for example, "You can update program XX. Function YY will be added by this update," thereby notifying the driver that one of the programs executed by the vehicle 3 is updatable.

The notification unit 362 may notify the driver that a program is updatable, in the case that the vehicle is in a drivable state at the current time and that the current time is within a time of day during which use of the vehicle 3 longer than a predetermined time (e.g., 30 minutes) was started. This operation of the notification unit 362 enables the module delivery system 1 to update a program with a delivered update module when the vehicle 3 is in a drivable state for a sufficiently long time. The notification unit 362 refers to the duration of a drivable state of the vehicle 3 stored in the memory 35 for each time of day, and thereby determines whether the current time is within a time of day during which the start of a drivable state of the vehicle 3 continuing longer than a predetermined time was recorded.

Alternatively, the notification unit 362 may notify the driver that a program is updatable, in the case that the vehicle is in a drivable state and stopped at the current time. This operation of the notification unit 362 enables the module delivery system 1 to make a notification of update of a program when the driver of the vehicle 3 can certainly respond to the notification. The notification unit 362 determines whether the vehicle 3 is stopped, by obtaining the moving speed of the vehicle 3 from a travel mechanism of the vehicle 3.

The update unit 363 determines whether the driver responding to the notification indicating that a program is updatable has performed a predetermined operation.

The predetermined operation is a touch onto a predetermined area on the meter display 31 (e.g., an area where a character string such as "Yes" is displayed), or may be to say, for example, "Yes." The update unit 363 determines whether the predetermined operation has been performed, by analyzing voice data obtained with a microphone (not illustrated).

If it is determined that the predetermined operation has been performed, the update unit 363 updates the program corresponding to a delivered update module stored in the memory 35 with the delivered update module. The programs are updated by the processor 36 executing delivered update modules. The programs may be updated by specifying a delivered update module and a corresponding program and executing a predetermined program-updating program.

When a program is updated with a delivered update module, the update unit 363 transmits data indicating a hold time of the delivered update module to the server 2 via the communication interface 34 and the data communication module 32. The hold time is determined as the difference between the time of update of the program with the delivered update module (current time) and the time of delivery of the delivered update module; the latter time is stored in the memory 35.

By operating as described above, the module delivery system 1 preferentially delivers an update module having an attribute with a short hold time from delivery until execution of update to the vehicle. For this reason, the module delivery system 1 can preferentially deliver an update module of a program of high priority for a vehicle driver to his/her vehicle.

In a module delivery system of a modified example, the vehicle 3 includes an ECU (subordinate ECU) in addition to the ECU 33. The ECU 33 requests the server 2 to deliver update modules for updating programs executed by the subordinate ECU, and notifies the driver that a program executed by the subordinate ECU is updatable. In response to a predetermined operation by the driver responding to the notification, the ECU 33 causes, for example, the subordinate ECU to execute a delivered update module, thereby updating the corresponding program of the subordinate ECU with the delivered update module. The ECU 33 then transmits a hold time of the delivered update module for updating the program executed by the subordinate ECU to the server 2. This enables the module delivery system to appropriately deliver update modules of programs executed by ECUs included in the vehicle.

Note that those skilled in the art can make various changes, substitutions, and modifications without departing from the spirit and scope of the present disclosure.

What is claimed is:

1. A module delivery system comprising a vehicle and a server, the vehicle being equipped with at least one processor to execute programs, the server being configured to deliver update modules for updating the respective programs to new versions to the vehicle via a communication network,
   the vehicle comprising the processor configured to:
      notify a driver of the vehicle that, of the programs, a program corresponding to a delivered update module delivered from the server is updatable, and,
      in response to a predetermined operation by the driver responding to the notification, update the program corresponding to the delivered update module with the delivered update module and transmit, to the server, data indicating a hold time from delivery of the delivered update module until update of the program corresponding to the delivered update module, and
   the server comprising a server processor configured to:
      calculate, for each of attributes, a representative value of hold times of delivered update modules having the attribute, and
      deliver an update module having a smaller representative value of hold times more preferentially to the vehicle via the communication network.

2. The module delivery system according to claim 1, wherein at the notification the processor of the vehicle notifies the driver that the program is updatable, in the case that the vehicle is in a drivable state at a current time and that the current time is within a time of day during which the start of a drivable state of the vehicle continuing longer than a predetermined time was recorded.

3. The module delivery system according to claim 1, wherein at the notification the processor of the vehicle notifies the driver that the program is updatable, in the case that the vehicle is in a drivable state and stopped at a current time.

4. The module delivery system according to claim 1, wherein at the delivery the server processor delivers an update module having an attribute with a smaller representative value of hold times earlier or through a communication channel with a broader band to the vehicle via the communication network.

5. A vehicle comprising a processor configured to:
   receive an update module having a smaller representative value of hold times sent more preferentially from a server to the vehicle via a communication network;
   notify a driver of the vehicle that, of programs executed by the processor mounted on the vehicle, a program corresponding to the update module delivered from the server via the communication network is updatable, and,
   in response to a predetermined operation by the driver responding to the notification, update the program corresponding to the update module delivered from the server with the update module and transmit, to the server, data indicating a hold time from delivery of the update module until update of the program corresponding to the update module.

6. A method for delivering modules, comprising:
   notifying a driver of a vehicle that, of programs executed by a processor mounted on the vehicle, a program corresponding to a delivered update module delivered from a server to the vehicle via a communication network is updatable;

in response to a predetermined operation by the driver responding to the notification, updating the program corresponding to the delivered update module with the delivered update module;

calculating, for each of attributes, a representative value of hold times, each being the time from delivery of the delivered update module having the attribute until update of the program corresponding to the delivered update module; and delivering an update module having a smaller representative value of hold times more preferentially to the vehicle via the communication network.

* * * * *

UNITED STATES PATENT AND TRADEMARK OFFICE
CERTIFICATE OF CORRECTION

PATENT NO. : 12,045,603 B2
APPLICATION NO. : 18/055460
DATED : July 23, 2024
INVENTOR(S) : Shiraishi et al.

It is certified that error appears in the above-identified patent and that said Letters Patent is hereby corrected as shown below:

On the Title Page

Item (30), the following foreign priority data should be added:
(30) Foreign Application Priority Data
Dec. 6, 2021 (JP) ................................... 2021-197915

Signed and Sealed this
Twelfth Day of November, 2024

Katherine Kelly Vidal
*Director of the United States Patent and Trademark Office*